United States Patent [19]

Cote

[11] Patent Number: 4,702,127
[45] Date of Patent: Oct. 27, 1987

[54] METHOD FOR CONTROLLING AMT SYSTEM INCLUDING GEAR NEUTRAL SENSOR SIGNAL FAULT DETECTION AND TOLERANCE

[75] Inventor: William F. Cote, Farmington Hills, Mich.

[73] Assignee: Eaton Corporation, Cleveland, Ohio

[21] Appl. No.: 853,816

[22] Filed: Apr. 18, 1986

[51] Int. Cl.$^4$ ............................................. B60K 41/04
[52] U.S. Cl. ........................................ 74/866; 74/335; 364/424.1
[58] Field of Search ............. 74/866, 856, 335, 336 R; 364/424.1, 187

[56] References Cited

U.S. PATENT DOCUMENTS

| | | | |
|---|---|---|---|
| 3,478,851 | 11/1969 | Smyth et al. | 74/866 |
| 3,703,109 | 11/1972 | Irie et al. | 74/866 |
| 4,081,065 | 3/1978 | Smyth et al. | 192/0.076 |
| 4,344,513 | 8/1982 | Etienne | 192/0.052 |
| 4,361,060 | 11/1982 | Smyth | 74/866 |
| 4,445,393 | 5/1984 | Braun | 74/346 |
| 4,523,281 | 6/1985 | Noda et al. | 192/0.033 |
| 4,527,447 | 7/1985 | Richards | 74/866 |
| 4,551,802 | 11/1985 | Smyth | 364/424.1 |
| 4,561,055 | 12/1985 | McKee | 364/424.1 |

FOREIGN PATENT DOCUMENTS 130812  1/1985  European Pat. Off. ............. 74/866

*Primary Examiner*—Rodney H. Bonck
*Assistant Examiner*—David A. Testardi
*Attorney, Agent, or Firm*—D. A. Rowe; H. D. Gordon

[57] ABSTRACT

A method for controlling an AMT system (10) is provided including sensing and identifying faulty input signals (GNS) from the gear neutral—not gear neutral sensor (76), and, if the signal is faulty, modifying the logic method for control (42) to a logic method tolerant of the identified faulty input signal.

6 Claims, 5 Drawing Figures

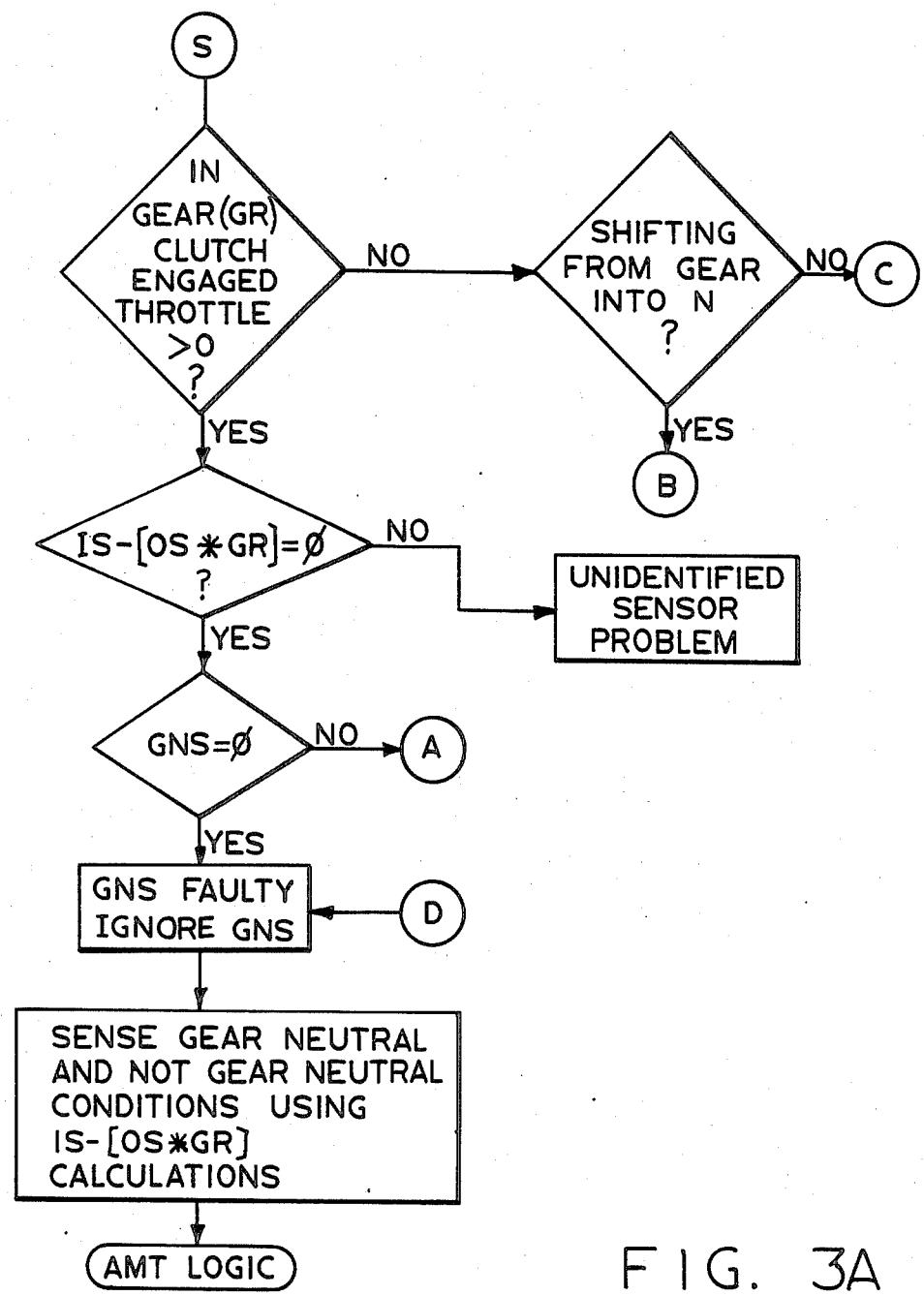
FIG. 3A

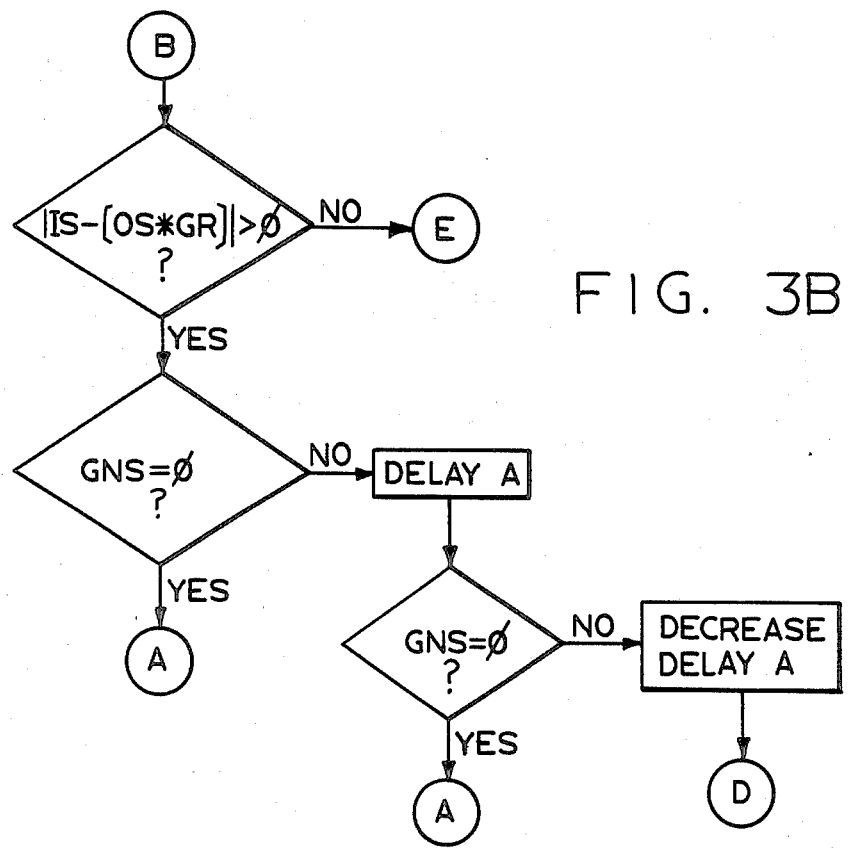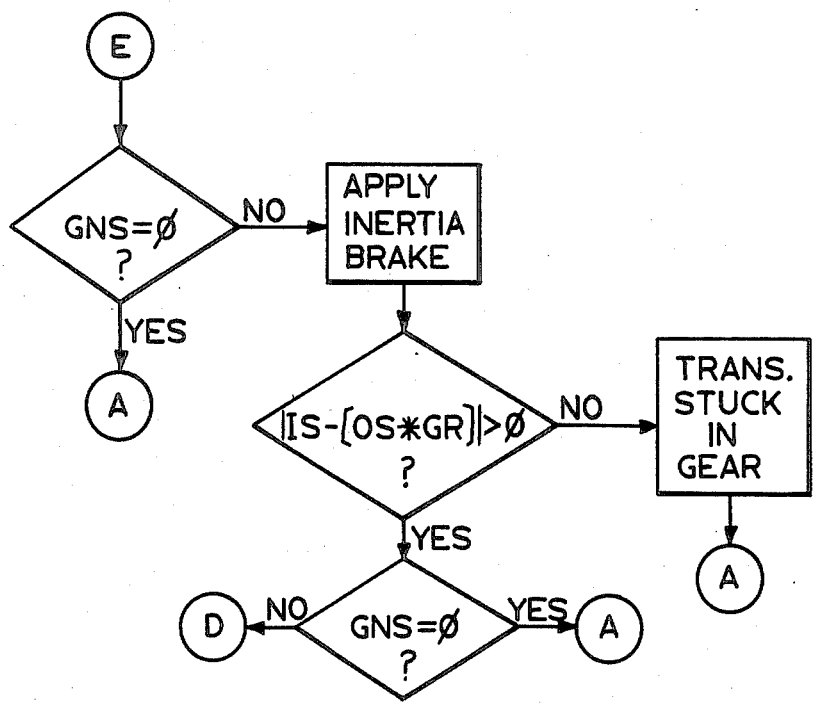
FIG. 3B

METHOD FOR CONTROLLING AMT SYSTEM INCLUDING GEAR NEUTRAL SENSOR SIGNAL FAULT DETECTION AND TOLERANCE

BACKGROUND OF THE INVENTION

1. Field of the Invention

This invention relates to automatic power transmissions providing a plurality of gear reduction ratios, such as automatic mechanical transmissions (i.e. "AMTs"), and, to control systems and methods therefor. In particular, the present invention relates to control systems and methods for automatic mechanical transmission systems wherein gear selection and shift decisions are made and/or executed based upon measured and/or calculated parameters such as engagement condition of the transmission, vehicle or transmission output shaft speed, transmission input shaft speed, engine speed, throttle position, rate of change of throttle position, rate of change of vehicle and/or engine speed and the like. More particularly, the present invention relates to a method for controlling an AMT system utilizing sensors for providing input signals indicative of the presence or absence of a transmission gear neutral condition, engine, transmission input shaft and transmission output shaft rotational speeds, etc. including sensing of a faulty signal from the gear neutral sensors and modifying the system operation logic in tolerance of such fault.

2. Description of the Prior Art

The use of automatic and/or semiautomatic transmissions of both the automatic mechanical type utilizing positive clutches and of the planetary gear type utilizing frictional clutches is well known in the prior art as are control systems therefor. Electronic control systems utilizing discrete logic circuits and/or software controlled microprocessors for automatic transmissions wherein gear selection and shift decisions are made based upon certain measured and/or calculated parameters such as the presence or absence of a transmission gear neutral condition, vehicle speed (or transmission output shaft speed), transmission input shaft speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like are known in the prior art. Examples of such automatic/semiautomatic transmission control systems for vehicles may be seen by reference to U.S. Pat. Nos. 4,361,060; 4,551,802; 4,527,447; 4,425,620; 4,463,427; 4,081,065; 4,073,203; 4,253,348; 4,038,889; 4,226,295; 3,776,048; 4,208,929; 4,039,061; 3,974,720; 3,478,851 and 3,942,393, the disclosures of which are all hereby incorporated by reference.

While the above referenced automatic/semiautomatic transmission control systems, and similar systems, are effective to control an automatic transmission by selecting and/or engaging a desired gear ratio which will tend to optimize the fuel economy and/or performance of the vehicle in view of the sensed parameters and then commanding a shift into the selected gear ratio, such control systems were not totally acceptable as the predetermined programs utilized did not include logic routines, or methods, to recognize and identify a fault in the input signals from the gear neutral condition sensors and/or could not modify the predetermined program to provide a tolerance to such a sensed fault.

SUMMARY OF THE INVENTION

In accordance with the present invention, the drawbacks of the prior art have been overcome or minimized by providing a control system, preferably an electronic control system, and control method, for automatic/semiautomatic mechanical transmission systems wherein gear selection and shift decisions are made and/or executed based upon measured and/or calculated parameters including at least input signals indicative of the presence or absence of a gear neutral condition, transmission input shaft speed and transmission output shaft speed. Other inputs/parameters, such as signals indicative of throttle position and/or rate of change of throttle position, condition of the master clutch, currently engaged gear ratio, operation of the vehicle brakes, and the like are also utilized to make decisions for control of the AMT system.

The predetermined logic rules or programs by which the various input signals are processed include a method for detecting a fault in the input signals from the gear neutral sensors and a method for modifying the predetermined logic in response to a sensed fault to provide an acceptable, if less than optimal, set of logic rules for continuing operation of the AMT system until such time as the fault ceases or is corrected.

A gear neutral condition sensor input signal is considered to be faulty if the value thereof is not, within acceptable tolerance limits, indicative of the true engaged or disengaged condition of the transmission or transmission section monitored thereby.

The above is accomplished by establishing a set of relationships between the engaged condition input signals, the transmission input shaft speed signal and the transmission output shaft speed signal which, under defined conditions, must be true. If, under the defined conditions, these relationships are not true, a fault in the input signals from one or more of the sensors exists, and various relationships are evaluated to identify the one or more faulty sensors. If the gear neutral sensor is in fault, the logic routines are modified to allow a continued system operation, in tolerance of such a sensed fault, until such time as the fault disappears (i.e. self-corrects) and/or is corrected.

Utilizing an alternate control method or algorithm structured specifically to a sensed non-standard condition, such as a sensed faulty input signal, in place of the control algorithm utilized in the absence of such non-standard conditions is, for purposes of describing this invention, referred to a modification to the control algorithm or program by which the input signals are processed for issuing the command output signals by which the AMT is controlled.

Accordingly, it is an object of the present invention to provide a new and improved control method for automatic mechanical transmission systems which involves sensing and identifying a fault in the gear neutral sensors and modifying the logic routines or algorithms by which the system is operated in tolerance of such sensed fault.

This and other objects and advantages of the present invention will become apparent from a reading of the description of the preferred embodiment taken in connection with the attached drawings.

BRIEF DESCRIPTION OF THE DRAWINGS

FIGS. 3A, 3B and 3C are symbolic illustrations, in the form of a flow chart, illustrating the preferred manner of practicing the method of the present invention.

DESCRIPTION OF THE PREFERRED EMBODIMENT

Figure 1:
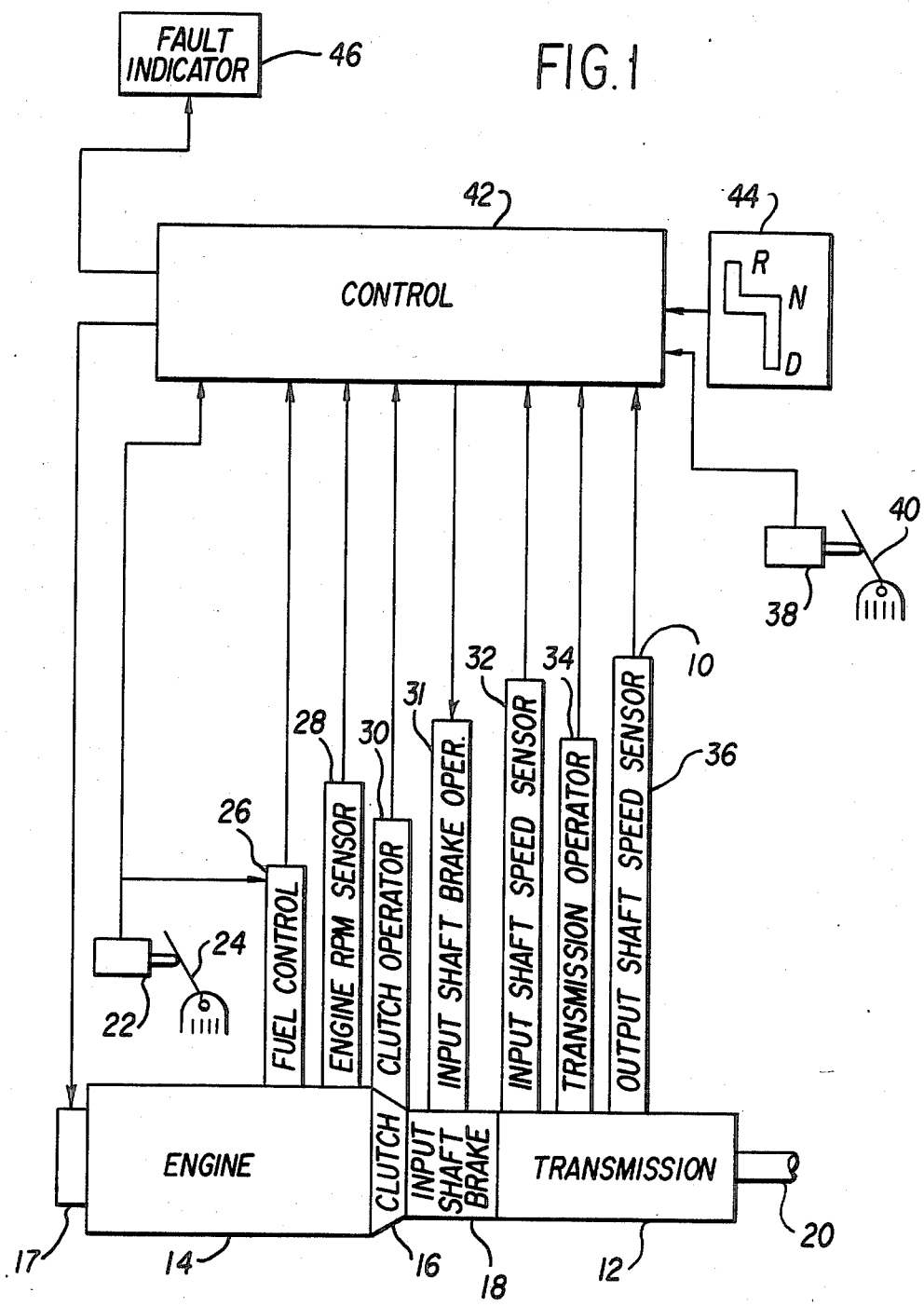
FIG. 1 is a schematic illustration of the components and interconnections of the automatic mechanical transmission control system of the present invention.

FIG. 1 schematically illustrates an automatic mechanical transmission system 10 including an automatic multi-speed compound change gear transmission 12 driven by a throttle controlled engine 14, such as a well known diesel engine, through a master clutch 16. An engine brake, such as an exhaust brake 17 for retarding the rotational speed of engine 14 and/or an input shaft brake 18 which is effective to apply a retarding force to the input shaft upon disengagement of master clutch 16 may be provided as is known in the prior art. The output of automatic transmsision 12 is output shaft 20 which is adapted for driving connection to an appropriate vehicle component such as the differential of a drive axle, a transfer case or the like as is well known in the prior art.

The above mentioned power train components are acted upon and monitored by several devices, each of which will be discussed in greater detail below. These devices include a throttle position or throttle opening monitor assembly 22 which senses the position of the operator controlled vehicle throttle or other fuel throttling device 24, a fuel control device 26 for controlling the amount of fuel to be supplied to engine 14, an engine speed sensor 28 which senses the rotational speed of the engine, a clutch operator 30 which engages and disengages clutch 16 and which also supplies information as to the status of the clutch, an input brake operator 31, a transmission input shaft speed sensor 32, a transmission operator 34 which is effective to shift the transmission 12 into a selected gear ratio and to provide a signal indicative of the gear neutral condition and/or currently engaged ratio, and a transmission output shaft speed sensor 36. A vehicle brake monitor 38 senses actuation of vehicle brake pedal 40.

A transmission operator for an AMT system including a gear neutral switch may be seen by reference to U.S. Pat. No. 4,445,393, the disclosure of which is hereby incorporated by reference. The above mentioned devices supply information to and/or accept commands from a central processing unit or control 42. The central processing unit 42 may include analogue and/or digital electronic calculation and logic circuitry, the specific configuration and struture of which forms no part of the present invention. The central processing unit 42 also receives information from a shift control assembly 44 by which the vehicle operator may select a reverse (R), neutral (N), or forward drive (D) mode of operation of the vehicle. An electrical power source (not shown) and/or source of pressurized fluid (not shown) provides electrical and/or pneumatic power to the various sensing, operating and/or processing units. A fault indicator or alarm 46 may display the identity of a specific fault or simply signal the existence of an unidentified fault. Drive train components and controls therefor of the type described above are known in the prior art and may be appreciated in greater detail by reference to above mentioned U.S. Pat. Nos. 4,445,393; 4,361,060; 3,776,048; 4,038,889 and 4,226,295.

Sensors 22, 28, 32, 36, 38 and 44 may be of any known type or construction for generating analogue or digital signals proportional to the parameter monitored thereby. Similarly, operators 17, 18, 26, 30 and 34 may be of any known electrical, pneumatic or electropneumatic type for executing operations in response to command signals from processing unit 42 and/or for providing input signals thereto. Fuel control 26 will normally supply fuel to engine 14 in accordance with the operator's setting of throttle 24 but may supply a lesser (fuel dip) or greater (fuel boost) amount of fuel in accordance with commands from control unit 42.

Figure 2:
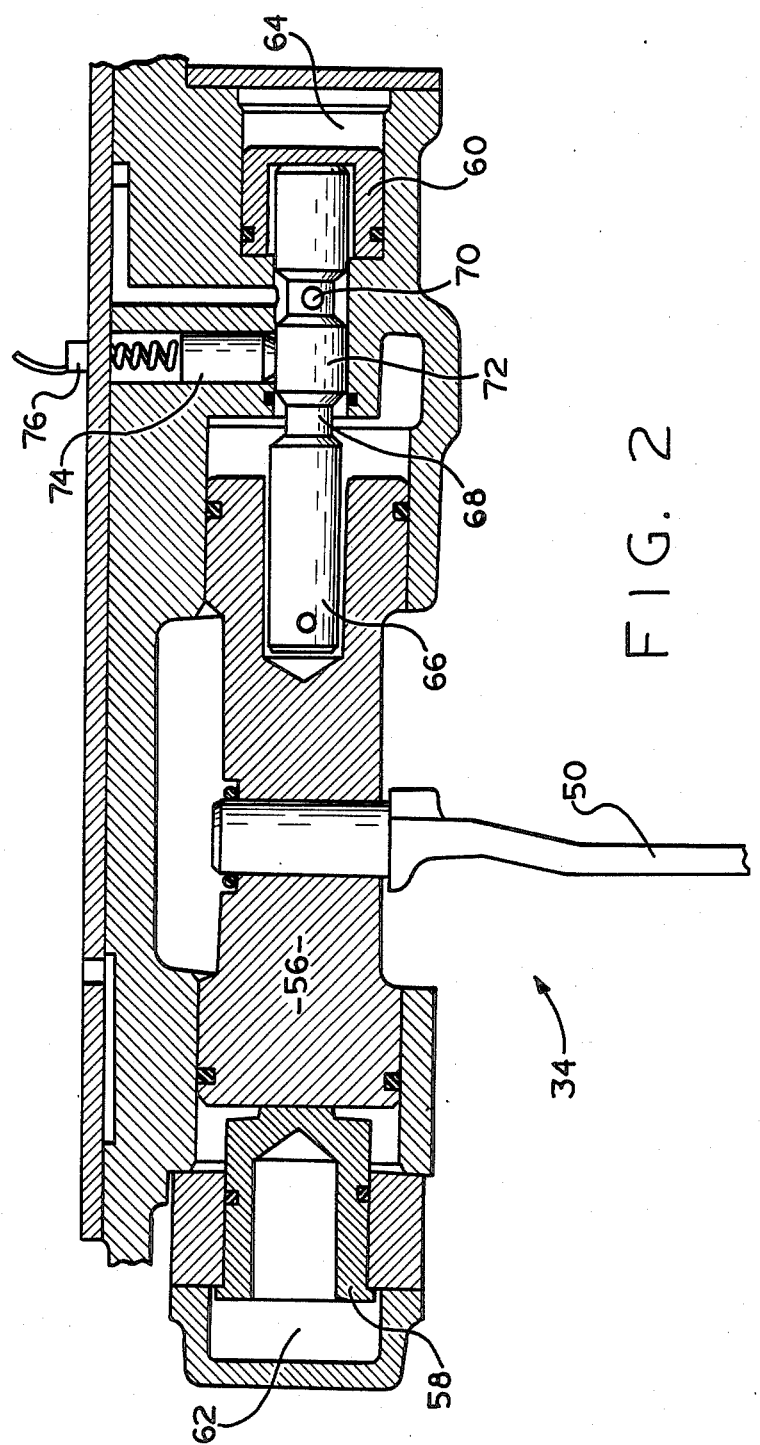
FIG. 2 is a partial sectional view of a transmission operator including a gear neutral sensor switch.

A portion of a typical transmission operator 34 may, for purposes of example only, be seen by reference to FIG. 2. Briefly, a shift fork 50 is carried by a shift rail 56 for axial movement therewith. A pair of opposed fluid actuated pistons, 58 and 60, are slidably and sealingly received in selectively pressurized cylinders, 62 and 64, respectively. A rod member 66 is axially movable with shift rod 56 and shift fork 50 and defines a pair of grooves, 68 and 70, separated by land 72. A spring biased plunger 74 cooperates with the land 72 to open gear neutral switch 76 and with grooves 68 and 70 to close gear neutral switch 76. The gear neutral switch 76 thus provides a gear neutral signal (GNS) having a first value (GNS=∅) to indicate the gear neutral condition and a second value (GNS=1) to indicate the not gear neutral condition.

The gear neutral sensor input signal, GNS, if not previously declared faulty, is utilized by the AMT controller, or central processing unit, 42, to control shifting of automatic/semiautomatic mechanical transmission 12. For example, during a shift sequence when the transmission is being shifted from a previously engaged gear into neutral, if the GNS indicates a gear neutral condition exists, the synchronization procedure may proceed. Also, after synchronization has occurred and the transmission 12 is being shifted into the most recently selected gear, if the GNS indicates that a not gear neutral condition exists, the transmission is considered engaged, or at least partially engaged, and the master clutch 16 may be re-engaged.

In the case of a fully automated AMT system 10, a purpose of the central processing unit 42 is to select, in accordance with a program (i.e. predetermined logic rules) and current or stored parameters, the optimal gear ratio at which the transmission should be operating and, if necessary, to command a gear change, or shift, into the selected optimal gear ratio based upon the current and/or stored information.

The various functions to be performed by central processing unit 42, and a preferred manner of performing same may be seen in greater detail by reference to U.S. Pat. No. 4,595,986 assigned to the assignee of this invention and to published Society of Automotive Engineers SAE paper No. 831776 published November 1983, the disclosures of which are hereby incorporated by reference.

The gear neutral switch or sensor 76 provides signals for processing by the central processing unit 42 which are important for optimal operation of the clutch operator 30, optimal selection of desired gear ratio and optimal synchronization of transmission 12 during an upshift or downshift. It is important that the inputs (GNS=∅ or GNS=1) provided by sensor 76 be periodically verified, and, if a fault is detected, the faulty sensor be identified and a modified logic be utilized to control system 10 which is tolerant to the identified faulty sensor.

Figure 3C:
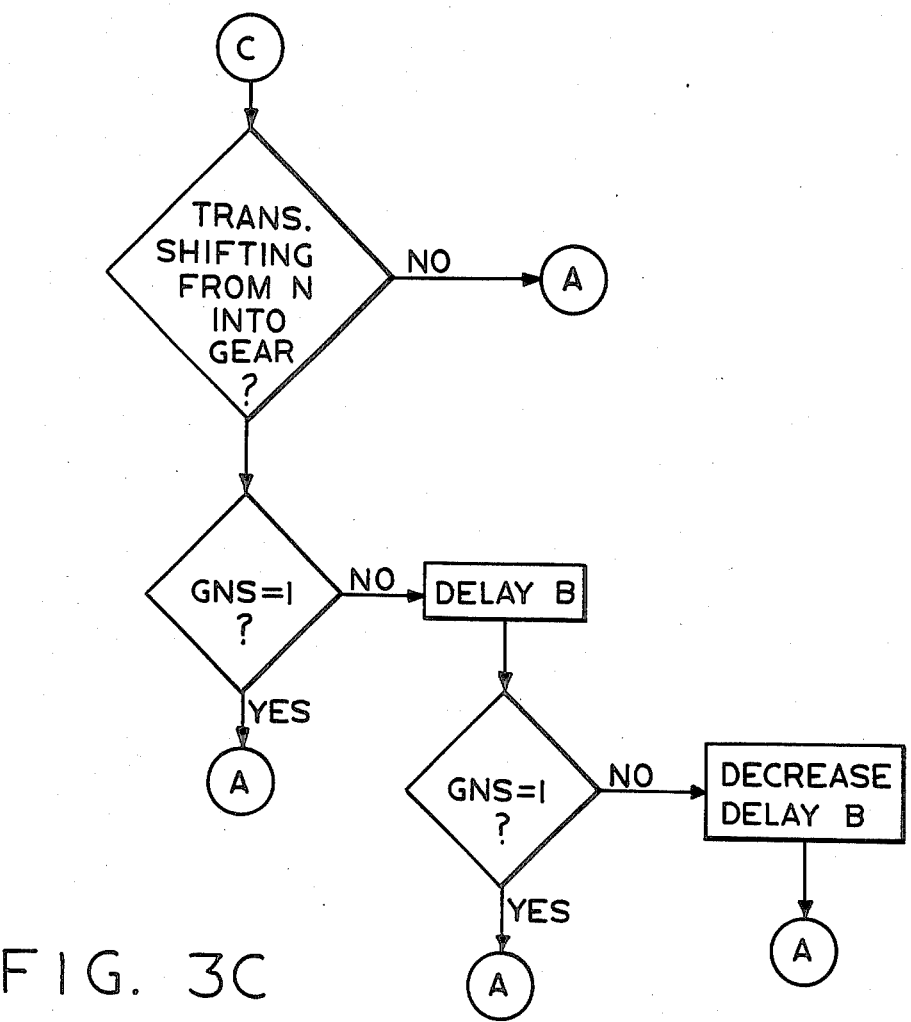

The method of the present invention for verifying the inputs from the gear neutral sensor 76, for identifying a faulty input signal GNS, and for adapting an appropriate fault tolerant logic for processing the input signals is schematically illustrated on FIGS. 3A-3C. The symbol "∅" is utilized to identify the number zero, the symbol "=" is used to identify an equal, or substantially equal, condition and the symbol "≠" is utilized to identify a not equal relationship. As stated above, the control or CPU 42 receives various input signals and processes these and/or stored information in accordance with a program of predetermined logic rules to issue command output signals for operation of the AMT system 10.

Fault Detection

Periodically, preferably at least once during each period of time in which the various mechanical actuators can react to a command output signal, the logic or control method utilized in processing unit 42 will attempt to verify the nonfaulty operation of the gear neutral sensors 76, and, if a fault is detected, modify the control logic in a manner tolerant to such a sensed fault.

Assuming central processing unit 42 is a microprocessor based control unit, a complete cycle of processing current and stored parameters and issuing command output signals can be accomplished in less than 15-20 milliseconds while a typical actuator, such a solenoid controlled valve or the like, will require a minimum of 20-30 milliseconds to cause even initial movements of an operator such as clutch operator 30.

The gear neutral sensor circuit can fail in one of two ways, namely GNS can indicate a gear neutral condition (i.e. GNS=∅) when the transmission 12 is actually not in neutral or the GNS circuit can indicate a not gear neutral condition (i.e. GNS=1) when the transmission 12 is actually in neutral. Upon detecting either type of fault, the GNS signal from sensor 76 is considered faulty, is ignored, a fault indicator, such as indicator 46, is actuated, and the logic is modified to provide an alternate method of sensing/calculating the presence or absence of a gear neutral condition.

Preferably, the first step is to verify the non-faulty operation of the gear neutral sensor, and if verified, or at least not detected as faulty, to proceed with the remainder of the control algorithm. The correct operation of the gear neutral sensor can be verified in various conditions, these include the transmission 12 being in gear with the clutch 16 engaged and throttle applied, a shift currently in progress where the transmission is being pulled in neutral and a shift currently in progress where the transmission is commanded to go into gear. Each of these modes will be described separately.

Transmission In Gear with Power Applied

When a shift is not in progress, the clutch 16 is engaged, and fuel is being supplied to the engine, a simple test is made to determine if the gear neutral switch 76 is accurately indicating the state of the transmission. If the absolute value of the input shaft speed (IS) minus the output shaft speed (OS) multiplied by the currently engaged gear ratio (GR) is, within limits, equal to zero, i.e. if IS−[OS*GR]=∅, the transmission is in gear. If GNS=∅, the input signal from the switch 76 is incorrectly indicating a neutral condition and the GNS signal is ignored and the switch 76 declared faulty.

Transmission Being Pulled To Neutral

When the transmission 12 is being pulled to neutral in the middle of a shift is the only time an incorrect not gear neutral (GNS=1) signal can be accurately detected. This is the most complex of the gear neutral switch fault detection modes. The routine first has to isolate that a fault exists with the gear neutral switch and not some other component. The detection and isolation function is performed by observing the absolute value of IS−[OS*GR]. If the absolute value of IS−(OS*GR) is greater than ∅, then the transmission 12 cannot be in the previously engaged gear. A timer begins to run to give the neutral switch 76 sufficient time to engage and respond. If the switch does not give a positive response (i.e. GNS=∅) within the allotted time, GNS is considered faulty and is ignored and a fault is indicated. Once a faulty GNS has been detected, the time delay provided by the timer to allow the switch to respond is no longer implemented after the error is detected.

If the absolute value of IS−[OS*GR] is greater than ∅ and/or GNS=∅ are not received within a specified time limit, a test is performed to determine if the transmission is actually still in gear or if it is in neutral and the switch 72 has failed. The test consits of pulsing on the inertia brake 18 and waiting to see if the absolute value of IS−[OS*GR] is significantly greater than ∅ can be induced. This test is performed three times before it is decided that the transmission will not come out of gear. If the test does produce the desired absolute value of IS−[OS*GR] is greater than ∅ and GNS=1, then GNS is considered faulty, is ignored and a fault indicator is actuated.

If GNS has not been previously detected as faulty and the desired absolute value of IS−[OS*GR] is greater than ∅ and GNS=∅, then GNS is considered verified and processing continues.

Transmission Being Driven Into Gear

The final case considered is when the transmission 12 is being driven into gear during a shift. In order to accurately determine when the transmission is actually in gear in the absence of a valid gear neutral switch signal is a very complex and difficult task to perform. Therefore, a shortcut is taken to simplify the required processing. This shortcut is considered valid because under normal conditions there always exists an uncertainty as to when the transmission actually goes into gear and because the system will auto correct for an inaccurate decision.

This mode does nothing more than implement a timer to wait for the loss of the gear neutral indication (i.e. wait for GNS=1) when the transmission is being driven into gear. No fault is flagged by this routine because at this point in time it is indeterminate if the switch 76 has actually failed or if a solenoid circuit or mechanical fault is to blame. As soon as the shift completes the first mode of gear neutral switch fault detection will flag a failed switch.

Once a fault switch 76 has been flagged a shorter time delay is used to indicate the loss of neutral since there is little sense in slowing down the shift to wait for a signal from a switch that is already known to be failed.

Logic Modification

Once the gear neutral switch, 76, and its input signal, GNS, are detected as faulty, and until a correction is made, the following logic modifications are made to allow sensing/calculating the gear neutral and not gear neutral conditions in the absence of a validated GNS signal.

Briefly, the modified logic determines if:

$$/IS-[OS*GR]/=\emptyset$$

or if:

$$/IS-[OS*GR]/ \text{ is greater than } \emptyset$$

to determine if a not gear neutral, or a gear neutral, condition, respectively exists.

The above provides an accurate method for determining the presence or absence of a gear neutral condition but is slower than sensing if GNS=$\emptyset$ or GNS=1 as verifying and/or causing proper conditions for calculating the /IS−[OS*GR]/ value does require a period of time, as does the pulsing on of inertia brake to assure that inertia does not mask an existing gear neutral condition, and thus shift times will be extended when utilizing this modified logic.

Although the AMT system 10 has been described as utilizing a microprocessor based control 42 and the methods and operations carried out as software modes or algorithms, it is clear that the operations can also be carried out in electronic/fluidic logic circuits comprising discrete hardware components.

Clutch operator 30 is preferably controlled by the central processing unit 42 and may engage and disengage master clutch 16 as described in above-mentioned U.S. Pat. No. 4,081,065. Transmission 12 may include synchronizing means, such as an accelerator and/or a brake mechanism as described in U.S. Pat. No. 3,478,851, hereby incorporated by reference. The transmission 12 is preferable, but not necessarily, of the twin countershaft type as is seen in U.S. Pat. No. 3,105,395, hereby incorporated by reference.

Although the present invention has been set forth with a certain degree of particularity, it is understood the various modifications are possible without departing from the spirit and scope of the invention as hereinafter claimed.

I claim:

1. A method for controlling an automatic mechanical transmission system (10) for devices having a throttle-controlled engine (14), a transmission having a plurality of gear ratio combinations selectively engageable between a transmission input shaft and a transmission output shaft, said transmission input shaft being operatively connected to said engine by means of a selectably engageable and disengageable coupling providing driving connection between said engine and said input shaft, said automatic mechanical transmission system comprising an information processing unit having means for receiving a plurality of input signals including (1) an input signal indicative of at least one of currently engaged, last engaged and about to be engaged gear ratio of the transmission; (2) an input signal indicative of the rotational speed of the transmission input shaft; (3) an input signal indicative of the rotational speed of the transmission output shaft, and (4) an input signal indicative of the gear neutral and not gear neutral conditions of said transmission, said gear neutral and not gear neutral condition input signal having a first value indicating the presence of a gear neutral condition and a second value indicating the presence of a not gear neutral condition, said processing unit including means for processing said input signals in accordance with a program and for generating output signals whereby said transmission system is operated in accordance with said program, and means associated with said transmission system effective to actuate said transmission system to effect engagement of said gear ratio combinations in response to said output signals from said processing unit, the method characterized by:

sensing the presence or absence of faulty input signals indicative of the presence of a transmission gear neutral condition and not gear neutral condition; and if said input signal indicative of transmission gear neutral condition and not gear neutral condition is determined to be faulty, ignoring said input signal indicative of gear neutral condition and not gear neutral neutral conditions and sensing a gear neutral condition if:

$$IS-[GR*OS]\neq\emptyset$$

and sensing a not gear neutral condition if:

$$IS-[GR*OS]=\emptyset$$

where:
- IS = a signal indicative of input shaft rotational speed;
- OS = a signal indicative of output shaft rotational speed; and
- GR = a signal indicative of: the currently engaged gear ratio if a transmission shift is not being executed, the last engaged gear ratio if the transmission is being commanded to shift from engagement into neutral and the about to be engaged gear ratio if the transmission is being commanded to shift from neutral into engagement.

2. The method of claim 1 wherein said input signals additionally include (5) an input signal indicative of engagement of such coupling and (6) an input signal indicative of throttle position, said sensing of a faulty input signal indicative of transmission gear neutral condition and not gear neutral condition comprising:

detecting a faulty gear neutral and not gear neutral input signal if said signal has said first value when a shift is not being commanded, throttle position is greater than idle, the coupling is engaged, and $$IS-[OS*GR]=\emptyset.$$

3. The method of claim 1 wherein sensing a faulty input signal indicative of gear neutral condition and not gear neutral condition comprises:

detecting a faulty gear neutral and not gear neutral input signal if during a command to shift from gear engagement into neutral, the input signal has said second value when IS−[OS*GR]$\neq\emptyset$.

4. The method of claim 2 wherein sensing a faulty input signal indicative of gear neutral condition and not gear neutral condition comprises:

detecting a faulty gear neutral and not gear neutral input signal if during a command to shift from gear engagement into neutral, the input signal has said second value when IS−[OS*GR]$\neq\emptyset$.

5. The method of claim 3, wherein said transmission system includes an input brake for applying a rotational resistance to said input shaft and said method includes the additional step of pulsing said input brake to its engaged condition prior to calculating the value of IS−[GR*OS].

6. The method of claim 4, wherein said transmission system includes an input brake for applying a rotational resistance to said input shaft and said method includes the additional step of pulsing said input brake to its engaged condition prior to calculating the value of IS−[GR*OS].

* * * * *